July 7, 1925.  
W. E. HOLLAND  
1,545,328  
STORAGE BATTERY CONTAINER  
Filed July 8, 1919  
4 Sheets-Sheet 1
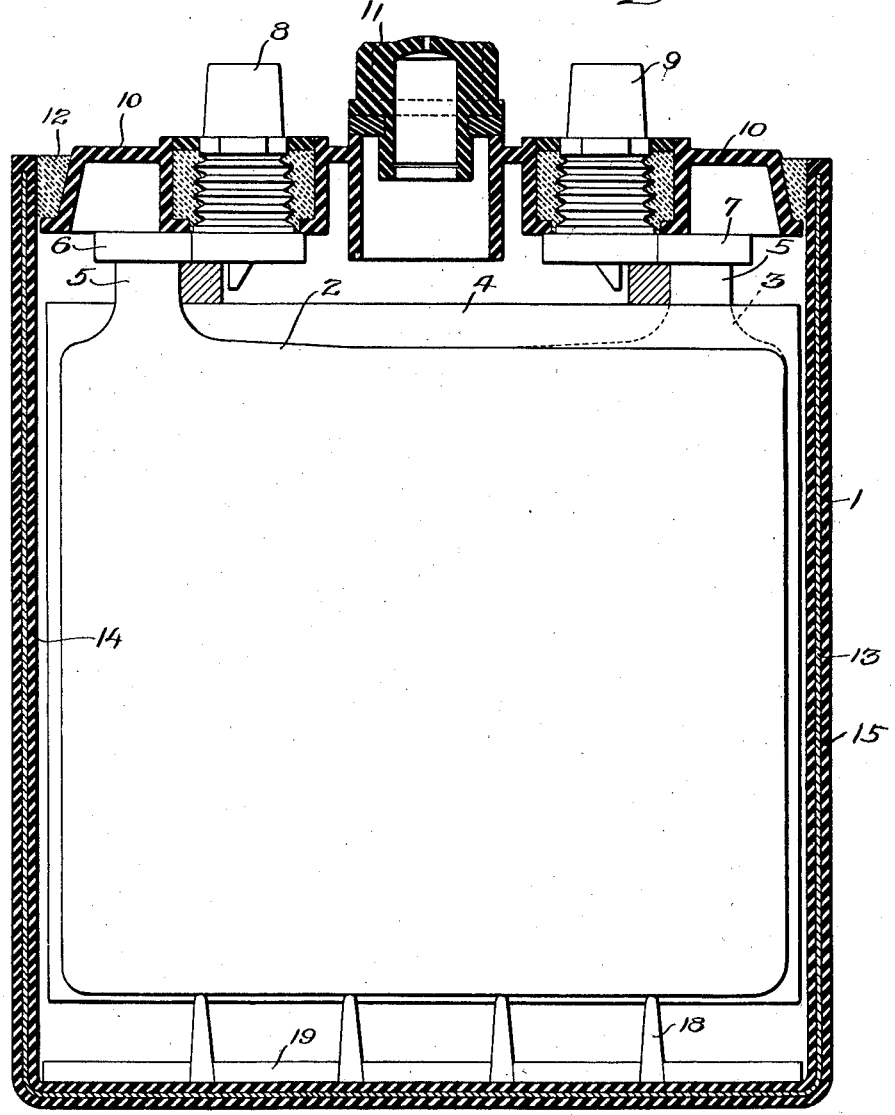
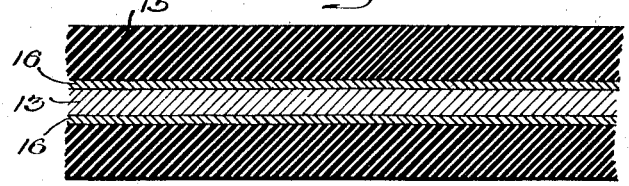
Inventor:—  
Walter E. Holland  
by his Attorneys.

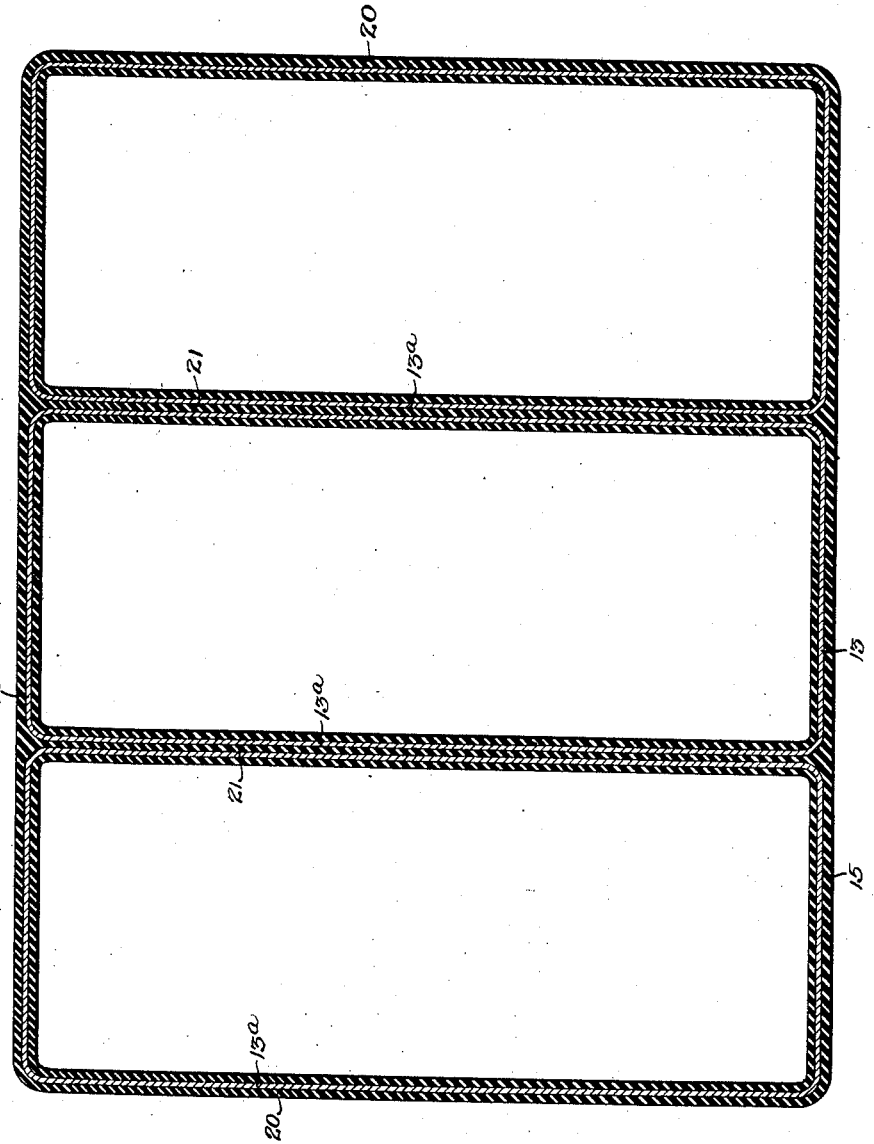

July 7, 1925.
W. E. HOLLAND
1,545,328
STORAGE BATTERY CONTAINER
Filed July 8, 1919          4 Sheets-Sheet 3
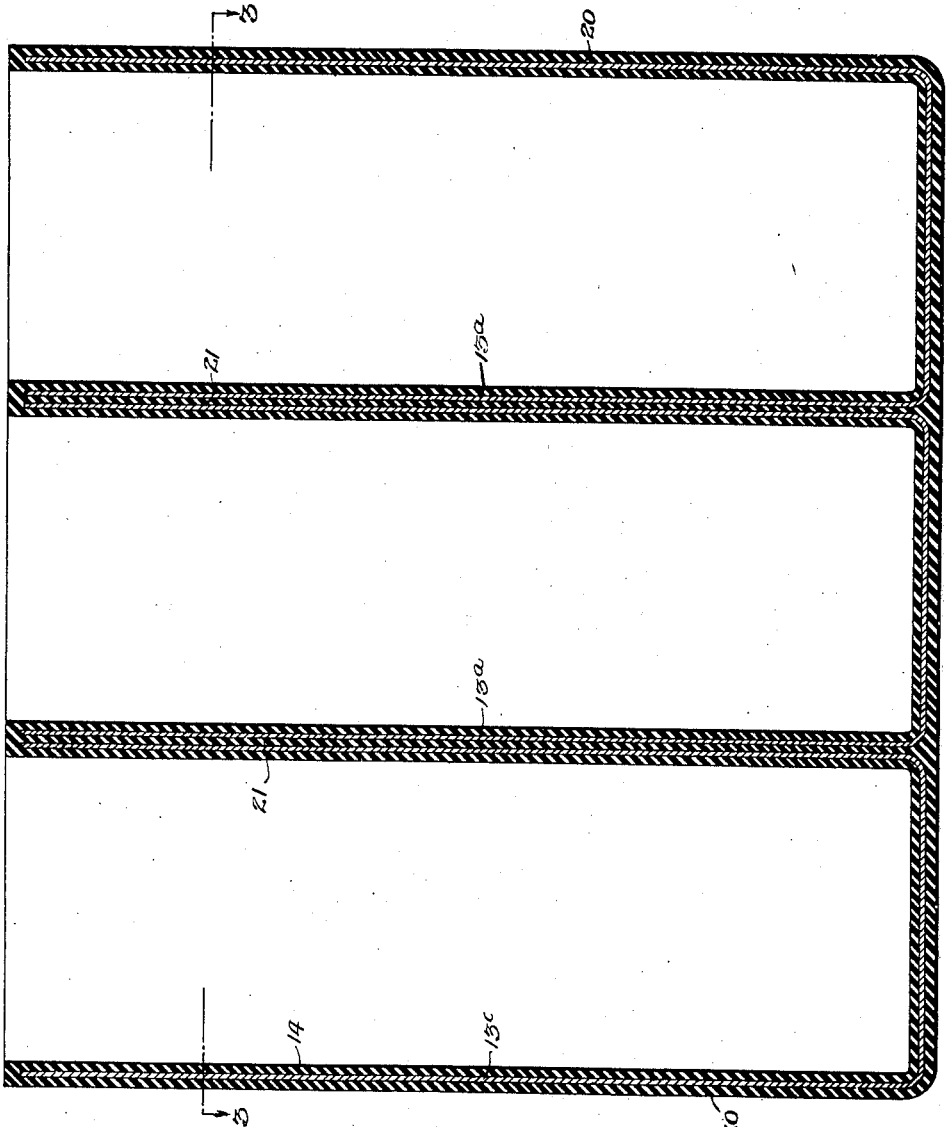
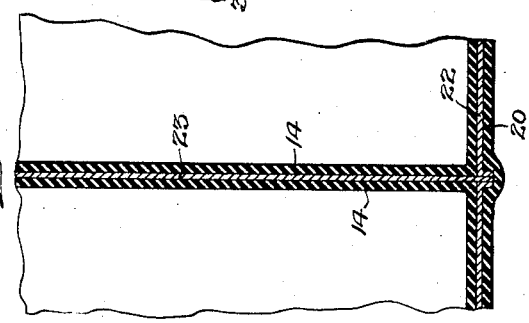
Inventor:—
Walter E. Holland.
by his Attorneys.
Howson & Howson

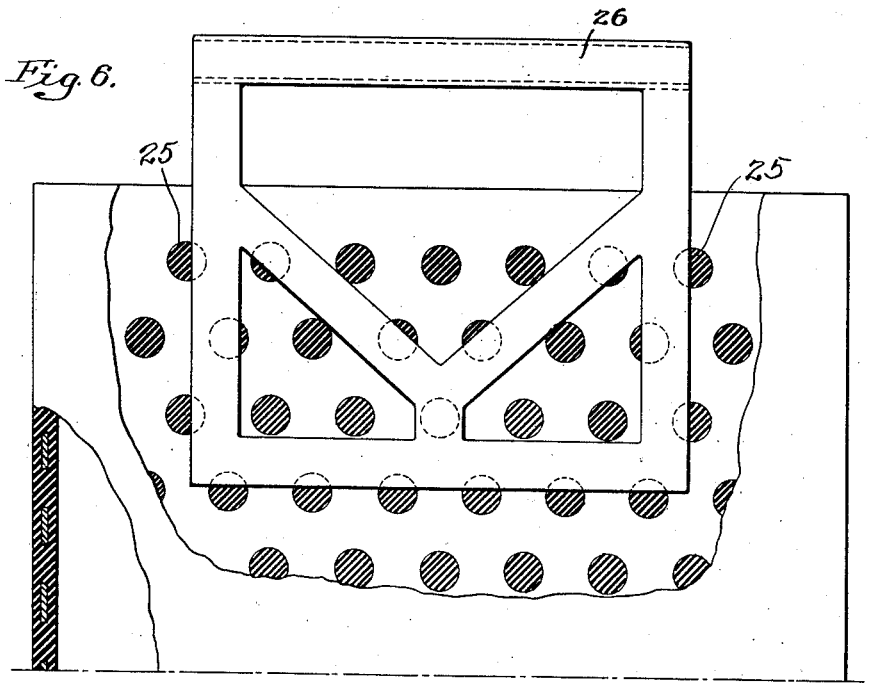
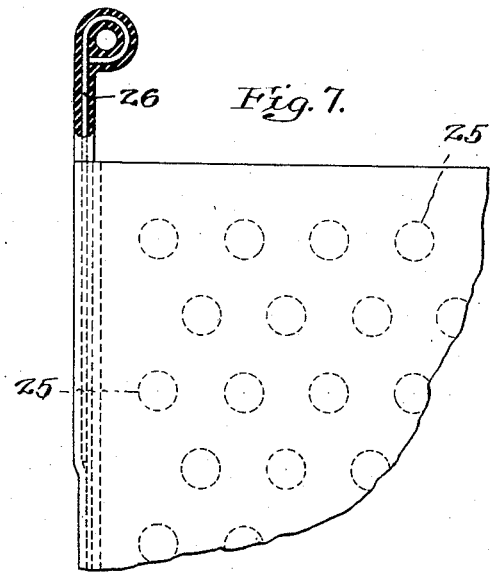

Patented July 7, 1925.

1,545,328

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

STORAGE-BATTERY CONTAINER.

Application filed July 8, 1919. Serial No. 309,335.

*To all whom it may concern:*

Be it known that I, WALTER E. HOLLAND, a citizen of the United States, residing in Philadelphia, Pennsylvania, have invented Storage-Battery Containers, of which the following is a specification.

One object of my invention is to provide a container of novel construction especially adapted for the reception of the electrolyte and electrodes of a battery, particularly of the so-called secondary or storage type; which container shall possess increased strength and stiffness, shall not tend to soften and become bulged at high temperatures or become brittle and crack at low temperatures, and which shall be leak-proof and practically unbreakable under conditions of service.

My invention further contemplates a battery container of such construction as shall serve as a cushioning means for preventing the transmission of damaging shocks or vibrations to the plates and separators which it contains, thereby materially lengthening the life of the battery in certain classes of service.

A further object of my invention is to provide a battery container which may utilize as its frame structure a mechanically strong but corrodible material such as steel and which shall include effective means for insulating and protecting this material throughout the life of the battery from the corrosive action of the electrolyte as well as from rust.

I also desire to provide a novel unitary form of multi-compartment container having great rigidity, compactness and strength without brittleness and which shall be capable of retaining its good qualities under all conditions of temperature, so that it may be used successfully without the customary wood case or other external means of support; such container thus providing a simple, durable structure available for use in place of the non-durable wood and breakable hard rubber structures hitherto employed, and at the same time, saving space and weight or, conversely, making it possible to provide a greater battery capacity in a given space.

These objects and other advantageous ends I attain as hereafter set forth, reference being had to the accompanying drawings, in which, Fig. 1 is a transverse vertical section of a storage battery cell including a container and plate supporting structure made in accordance with my invention;

Fig. 2 is a vertical longitudinal section of a multi-compartment container embodying the vital features of my invention;

Fig. 3 is a horizontal section on the line 3—3, Fig. 2;

Fig. 4 is a fragmentary vertical section of a modified form of cell construction.

Fig. 5 is an enlarged transverse section illustrating the detail construction of one form of the wall of a container made in accordance with my invention; and Figs. 6 and 7 are fragmentary elevations, the first partly in section, illustrating a modified form of my invention.

In Fig. 1 of the above drawings, 1 represents the container of a storage battery cell in which are mounted alternated positive and negative plates 2 and 3 with interposed separators 4. The upwardly projecting lugs 5 of these two sets of electrodes or plates are respectively connected by two terminal straps 6 and 7, of which the first has a terminal post 8 and the second has a similar post 9 projecting above the plane of the top of the container.

The cell is normally closed by a cover 10 of insulating material provided with suitable openings for the passage of the terminals 8 and 9, in addition to which it has a filling opening normally closed by a gas venting plug or cap 11. This may be removed for the addition of liquid and is so formed as to permit of the escape of gas without permitting the escape of liquid. The cover 10, in the construction shown, is held in place by sealing compound 12 which fills the channel formed between its outermost flange and the inner faces of the container 1.

In accordance with my invention the container 1 consists of a box 13 of sheet metal usually steel, either pressed up in seamless form from a flat sheet or formed with seams from one or more pieces suitably shaped and folded, welded, soldered or otherwise joined together. This metal box or body is provided with an inner coating 14 and outer covering 15 of insulating acid-proof material such as soft or semi-hard rubber, bakelite, condensite, gutta percha, celluloid or other material having the necessary insulating, electrolyte-proof and mechanical qualities, whereby access to the metallic body 13 of the liquid employed in the container is effectually prevented.

In the preferred form of my invention the insulating covering for the sheet metal body 13 is bonded to the latter and in case sheet steel is employed for said body and rubber is used for the protective covering, it is advisable that the inner and outer surfaces of the body be first coated with a layer 16, Fig. 5, of some material which will form a substantially inseparable bond with it as well as with the rubber which is usually of the soft or semi-hard variety. This bonding material between the body 13 of the container and the protective covering consists preferably of a metal such as antimony, bismuth or arsenic or an alloy containing at least one of these metals, for example, an alloy of sixty parts copper, thirty-eight parts zinc and two parts antimony, electrolytically or otherwise deposited upon the sheet steel and capable of bonding with rubber at the vulcanizing temperature. Instead of the metal bonding material any suitable cement or gum may be used between the metal body 13 and the protective covering of insulating material. If desired the metal box 13 may itself in some cases be made of an alloy of antimony, bismuth or arsenic or of other metal having this characteristic of bonding with rubber during vulcanization so that the cement or intermediate bonding layer 16 may in such case be omitted.

In building the container, the sheet metal body 13 may have raw rubber compound applied to its inner and outer surfaces, preferably under pressure in suitable molds, after which it is subjected to the treatment necessary to vulcanize the latter. In the case illustrated I have shown a separate piece having plate-supporting ribs or strips 18 placed in the bottom of the cell 1 so as to support the plates or electrodes 2 and 3 above said bottom. These ribs extend across said container and are properly spaced and supported by one or more transverse strips or rods 19, the whole being preferably molded into one piece of hard rubber or other suitable insulating material, although if desired, the ribs may be vulcanized integrally so as to receive support from the inner coating of rubber. In any case the ribs 18, and therefore the plates carried thereby, are yieldingly supported or cushioned both by the inner and outer rubber layers of the frame or box.

One important feature of my invention resides in the provision of a multi-compartment container which is practically unbreakable, leak-proof and mechanically strong and which has other qualities, such as ability to withstand high temperatures without softening or bulging and freedom from becoming brittle at low temperatures, whereby it is adapted for use without the customary wood case or tray. Such a multi-compartment container may be made of a series of metal boxes 13ᵃ, each having an interior coating 14 of insulating material and an outer coating 20 also of insulating material whereby they not only have their exterior surfaces protected from corrosion and electrically insulated but in addition are held together as a single unitary structure, there being in addition sheets or layers of insulating material 21 extended respectively between and bonded with the adjacent faces of the boxes.

In constructing this form of my invention, the metal boxes first have their inner soft rubber or other protective linings 14 applied under pressure in a mold, or by any other suitable process, after which the intermediate bonding sheets 21 are placed between their adjacent faces. All of them are then wrapped and bound together with a sheet or series of rubber sheets extending over their side and bottom surfaces, the whole structure being finally subjected to a vulcanizing process whereby, as above noted, all of its parts would be permanently connected to form a unitary multi-compartment structure.

Instead of providing a number of independent metal boxes or bodies as shown in Figs. 2 and 3, I may use a single large body or box, a portion of which is shown at 22 in Fig. 4, in which any suitable number of metallic partitions 23 are united, by welding or otherwise, with the suitably formed side and bottom members to form a unitary multi-compartment metal container having compartments or chambers of approximately the same form and dimensions as those of the container shown in Fig. 2. Thereafter the inner and outer surfaces of this metal body would be given an insulating protecting covering 14—20, it being understood that in all of the above cases a bonding layer of cement metal or other material 16 is applied or omitted as required by the particular materials and construction employed for the metal body and the protective covering respectively.

If desired the metal frame or body of the container may be formed of perforated sheet material as shown in Figs. 6 and 7, in which case no cement or bonding coating is necessary, since the rubber coverings of the two faces are connected and held together by integral bodies of rubber which extend through the perforations 25. Any handles 26 required are preferably made of suitably shaped sheet metal pieces spot welded to the frame or body structure, and thereafter given a rubber or other protective insulating covering.

In any case the container provided by my process consists of a structurally stiff sheet metal body which is relatively light and strong and at the same time effectually protected from rust and from corrosion or injury by the electrolyte. Moreover the walls of this container in those forms of the invention shown in Figs. 2 to 4 inclusive, occupy considerably less space than is ordinarily required for the containers and wooden box or tray hitherto necessarily employed in batteries and, conversely, greater battery capacity can be provided in a given space. Obviously the container is not injuriously affected by temperature changes or by the highest temperatures encountered in storage battery work, since it will neither bulge nor soften and will not crack at low temperatures. In case rubber or similar elastic material is used as the protective covering, its resiliency causes it to absorb injurious shocks or vibrations otherwise transmitted to the contained battery plates and thereby tends to increase their useful life.

I claim:

1. The combination in a battery container of a plurality of metal boxes; with a protective covering of rubber vulcanized to the inner and outer surfaces of said box as well as between the adjacent portions thereof and bonding them together into a unitary structure.

2. A battery container consisting of a metal frame; handles; and a resilient protective material covering said frame and handles.

3. The combination in a battery container of a plurality of structurally independent sheet metal boxes; with insulating protective material covering the surfaces of said boxes and bonding them together into a unitary structure.

4. The combination in a battery container of a plurality of structurally independent sheet metal boxes; with insulating protective material covering the inner and outer surfaces of said boxes and bonding them together into a unitary structure, said material extending between the adjacent portions of said boxes and electrically insulating them one from the other.

5. The combination in a battery container of a metal box; metal handles fixed thereto; and a rubber protective covering for the box and handles.

6. The combination in a battery container of a metal box; metal handles fixed thereto; and an insulating coating extending continuously over the inner and outer surfaces of said box and enclosing the handles.

In witness whereof I affix my signature.

WALTER E. HOLLAND.